(12) United States Patent
Day

(10) Patent No.: US 7,517,012 B2
(45) Date of Patent: Apr. 14, 2009

(54) REVERSIBLE FOOD AND GAME TRAY DEVICE

(76) Inventor: Lesley C. Day, 1690 Granite Chief Dr., Reno, NV (US) 89521

( * ) Notice: Subject to any disclaimer, the term of this patent is extended or adjusted under 35 U.S.C. 154(b) by 387 days.

(21) Appl. No.: 11/342,120

(22) Filed: Jan. 27, 2006

(65) Prior Publication Data

US 2007/0176469 A1    Aug. 2, 2007

(51) Int. Cl.
*B60N 2/28* (2006.01)

(52) U.S. Cl. ................ 297/153; 297/174 R; 297/250.1; 108/13

(58) Field of Classification Search ................ 297/153, 297/174, 250.1; 108/11–13
See application file for complete search history.

(56) References Cited

U.S. PATENT DOCUMENTS

| | | | |
|---|---|---|---|
| 3,667,803 A * | 6/1972 | Ford | 297/119 |
| 4,668,010 A * | 5/1987 | Fujiwara | 297/150 |
| 4,906,043 A | 3/1990 | Davis et al. | |
| 5,427,292 A | 6/1995 | Rousch | |
| 5,984,347 A * | 11/1999 | Blanc-Rosset | 297/146 |
| 6,113,182 A * | 9/2000 | Wise | 297/119 |
| RE37,239 E | 6/2001 | Eisenberg | |
| 6,305,299 B1 | 10/2001 | Ragland | |
| 6,511,124 B2 | 1/2003 | Combs | |
| 6,702,375 B1 * | 3/2004 | Laskowski et al. | 297/188.07 |
| 6,764,409 B1 * | 7/2004 | Voden | 473/10 |
| 6,926,278 B2 * | 8/2005 | Bibi | 273/284 |

* cited by examiner

*Primary Examiner*—Peter R. Brown
(74) *Attorney, Agent, or Firm*—Dale J. Ream

(57) ABSTRACT

A reversible food and game tray device for use with a child safety seat includes a two-sided tray that is easily reversible between two sides. One side includes a generally flat surface on which books, toys, games, and the like may be rested for use by a child. An opposed side defines multiple recesses for holding plates, cups, napkins, food, and drink items. The tray includes coupling elements for holding the tray in place as well as for enabling the tray to be quickly and easily reversed between the game and food surfaces. The coupling elements include at least one pin cooperatively positioned for releasably engaging a track. Preferably, two pairs of pins are provided along with a control lever for selectively retracting a selected pair of pins. Operation of the lever enables the tray to be pivoted, slid, and thus reversed.

8 Claims, 8 Drawing Sheets

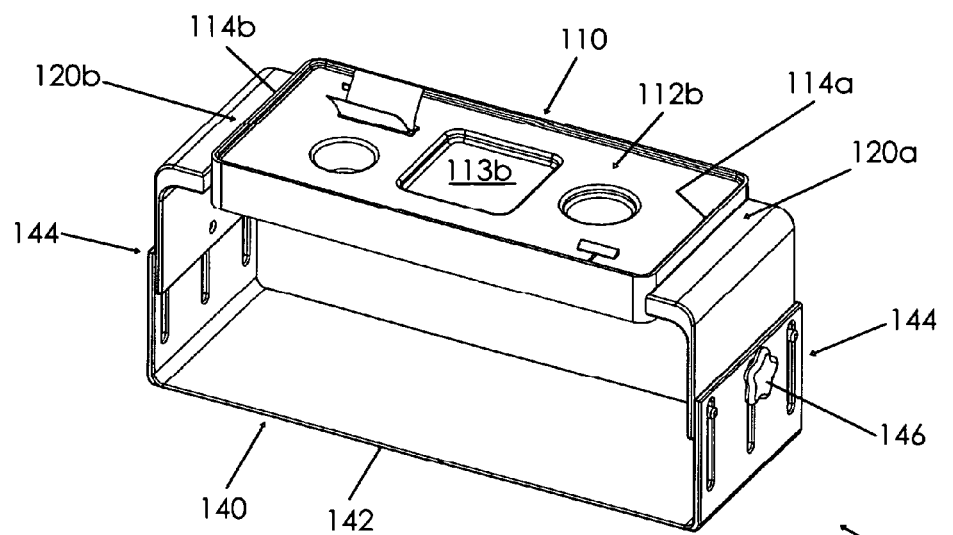
Fig. 3a
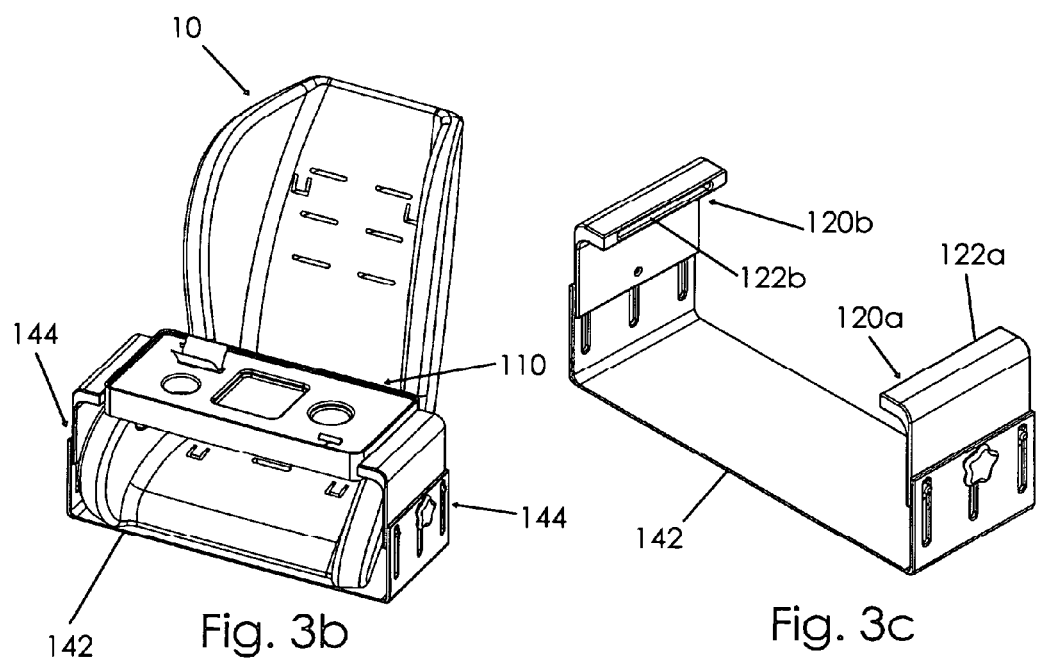
Fig. 3b
Fig. 3c

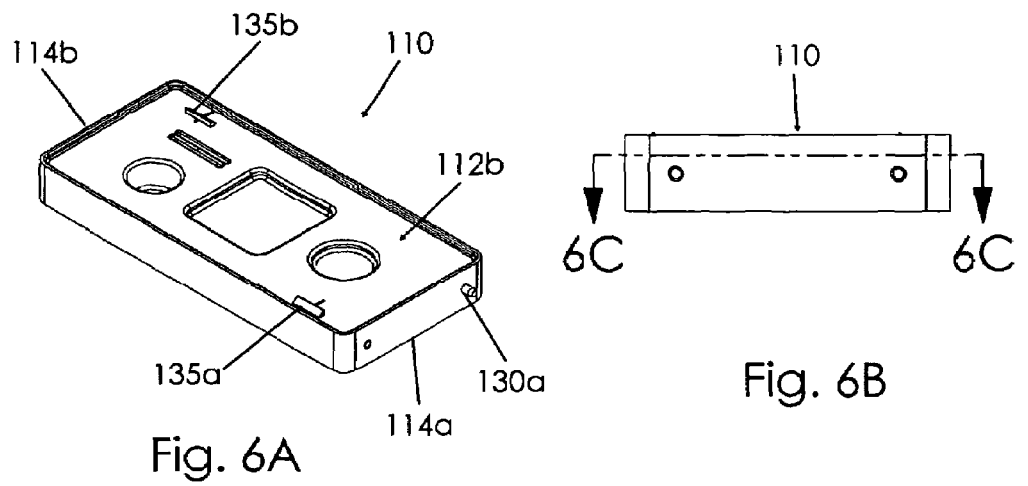

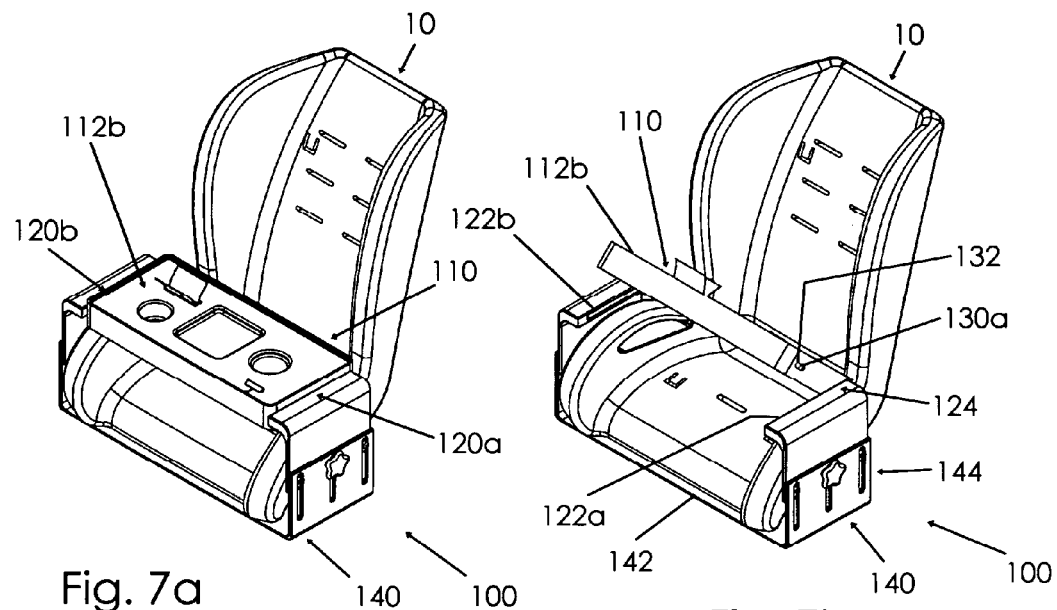
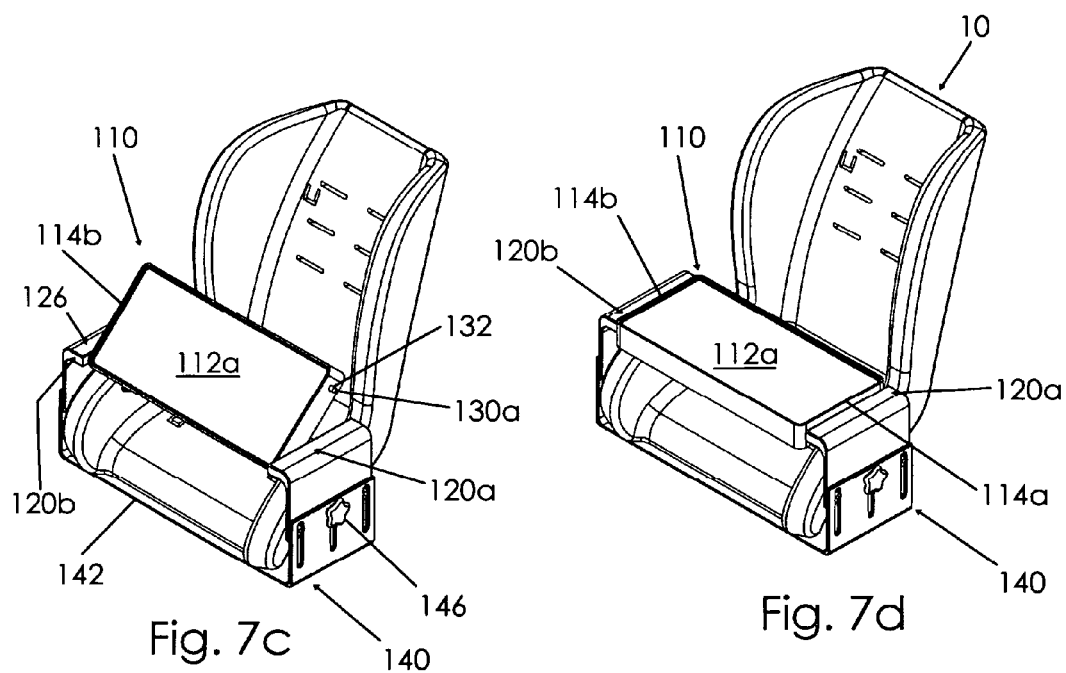

REVERSIBLE FOOD AND GAME TRAY DEVICE

BACKGROUND OF THE INVENTION

This invention relates generally to food and game devices and, more particularly, to a reversible food and game tray device for use with an automotive child safety seat.

Enabling toddlers to neatly eat and providing them with adequate entertainment while riding in a vehicle are difficult but consistently needed tasks for parents or other caregivers. Providing food to toddlers seated in their booster or safety seats often results in a mess on the child's clothing or in a mess on the vehicle seat or floor. The mess may be the result of the child's inability and inexperience with managing multiple food items and drink at the same time without having a large flat surface on which to rest these items. The lack of entertainment is, again, frequently the result of not having an adequate surface on which to rest a picture book, coloring book, or other manipulatives like toy cars, trucks, or games.

Various tray devices have been proposed in the art for supporting food items while traveling in a vehicle. Although assumably effective for their intended purposes, the existing devices either do not provide the dual functions of supporting food service usage and entertainment or they do not provide a quick and convenient means for selectively alternating these functional means.

Therefore, it would be desirable to have a food and game tray device in which a tray includes a game and entertainment surface on one side and a food serving surface on a reverse side thereof. Further, it would be desirable to have a food and game tray device that includes coupling elements such as a track and pin assembly by which the tray may be selectively alternated between the two surfaces. In addition, it would be desirable to have a combination food and game device that may be quickly and easily attached to a child booster car seat.

SUMMARY OF THE INVENTION

A food and game device according to the present invention includes a tray having first and second sides and first and second ends. The first side includes a generally flat region upon which entertainment objects may be rested, such as reading/picture books, coloring books, toys, games, or the like. The second side presents a plurality of recesses having different configurations for holding food and drink items. In other words, the second side is configured for serving snacks and meals to a child in a stable manner that will avoid most spills.

Preferably, the opposed ends of the tray include pins that are cooperatively positioned to engage a track. The device includes one or more a control levers for selectively retracting a particular set of pins, which allows a forward or rearward edge of the tray to pivot upwardly, and allows the tray to slide along the track on the unreleased set of pins. Then, the tray may be returned to the flat position but now the opposed surface faces upward. In other words, the tray may be slidably moved and then pivoted such that the current top surface becomes the bottom surface and vice versa. Therefore, the tray device may be inverted for its dual uses very quickly and easily.

Therefore, a general object of this invention is to provide a food and game tray device for use with a child's automobile safety seat.

Another object of this invention is to provide a food and game tray device, as aforesaid, having a two-sided tray that is easily reversible between two configurations.

Still another object of this invention is to provide a food and game tray device, as aforesaid, having opposed sides with one side having a generally flat surface upon which books, toys, and game objects may rest and another side defining a plurality of recesses in which food items or containers may be held for food service purposes.

Yet another object of this invention is to provide a food and game tray device, as aforesaid, in which opposed ends or end edges of the tray include coupling elements for quick and easy reversal of the tray.

A further object of this invention is to provide a food and game tray device, as aforesaid, in which the coupling elements include a pair of pin sets and a track for selective slidable movement and inversion of the tray.

A still further object of this invention is to provide a food and game tray device, as aforesaid, having a lever for selectively releasing a particular set of pins such that the tray may be pivoted upward, slidably moved forward or backward, and then pivoted back to a flat configuration.

Other objects and advantages of this invention will become apparent from the following description taken in connection with the accompanying drawings, wherein is set forth by way of illustration and example, embodiments of this invention.

BRIEF DESCRIPTION OF THE DRAWINGS

FIG. 2b is an isolated view on an enlarged scale of a portion of the reversible tray device as in FIG. 2a;

FIG. 3a is a perspective view of the tray as in FIG. 1a releasably mounted to a base according to the preferred embodiment of the invention; FIG. 3b is a perspective view of the tray device as in FIG. 1a in use with a child safety seat;

FIG. 3c is a perspective view of the base as in FIG. 3a removed from the tray device;

FIG. 4 is an exploded view of the tray device as in FIG. 3a;

FIG. 6a is another perspective view of the tray as in FIG. 1a;

FIG. 6b is an end view of the tray as in FIG. 6a;

FIG. 6c is a sectional view of the tray taken along line 6C-6C of FIG. 6B;

FIG. 7a to 7d are perspective view illustrating movement of the tray between food-side-up and game-side-up configurations;

DESCRIPTION OF THE PREFERRED EMBODIMENT

A reversible food and game tray device 100 according to the present invention will now be described in detail with reference to FIGS. 1 through 8b of the accompanying drawings. More particularly, a reversible food and game tray device 100 for use with a child safety seat 10 according to the current invention includes a tray 110 and first and second coupling elements 120a, 120b.

Figure 1A:
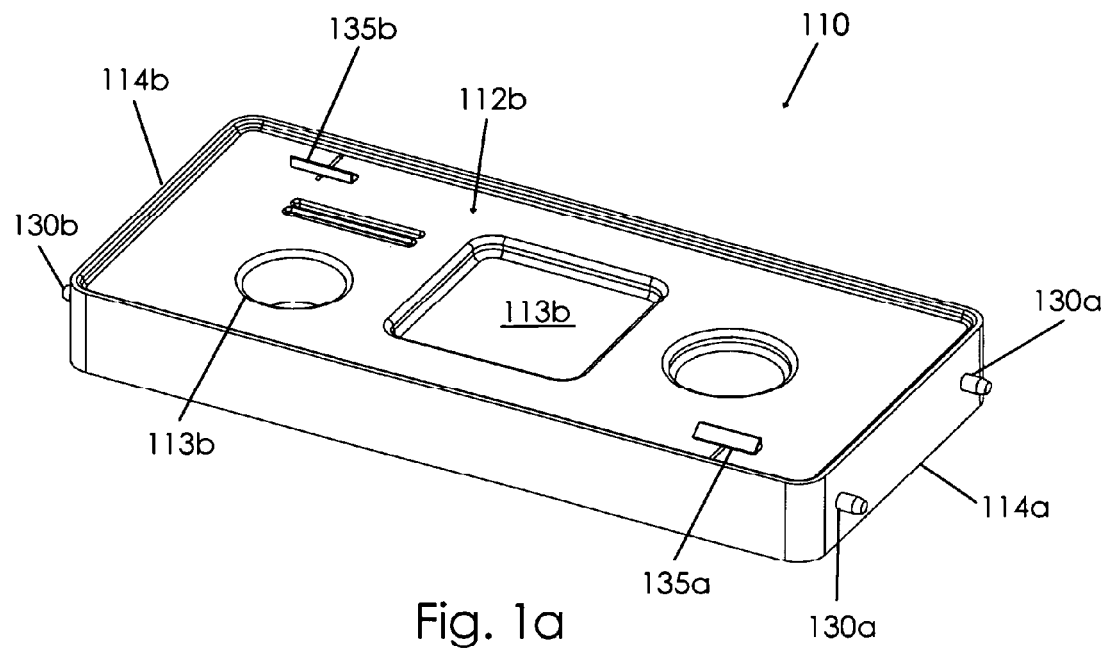
FIG. 1a is a perspective view of a tray of a reversible food and game tray device according to a preferred embodiment of the present invention in a food-side-up configuration.
Figure 1B:
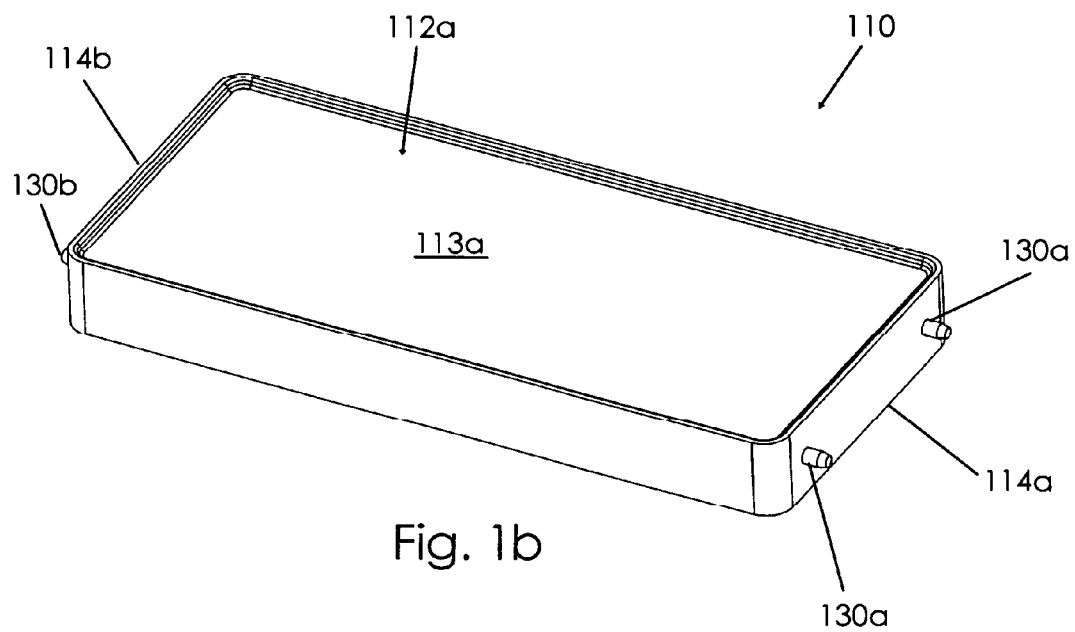
FIG. 1b is a perspective view of the tray as in FIG. 1a in a game-side-up configuration.

The tray 110 has opposed first and second sides 112a, 112b and opposed first and second ends 114a, 114b. As shown in FIG. 1b, the first side 112a preferably includes a predominantly flat region 113a. The second side 112b (FIG. 1a) preferably defines a plurality of recessed areas 113b for holding various objects, such as plates, cups, napkins, etc. The tray 110 is attachable to the first and second coupling elements 120a, 120b so that both the first and second sides 112a, 112b may be respectively positioned at an upward configuration, and the tray 110 is preferably separable from the first and second coupling elements 120a, 120b.

As shown in FIGS. 1a, 1b, and 3a-8b, one or more pin 130a may selectively extend outwardly from the tray first end 114a, one or more pin 130b may selectively extend outwardly from the tray second end 114b, the first coupling element 120a may include a track 122a complementary to the one or more pin 130a, and the second coupling element 120b may include a track 122b complementary to the one or more pin 130b. Placement of the one or more pin 130a in the first track 122a and placement of the one or more pin 130b in the second track 122b may secure the tray 110 to the coupling elements 120a, 120b. In other words, the first track 122a may selectively support the one or more pin 130a, and the second track 122b may selectively support the one or more pin 130b.

As best depicted in FIG. 6c, it is currently preferred that one pin 130a extending from the tray first end 114a shares a first common axis with one pin 130b extending from the tray second end 114b. The pins 130a, 130b sharing the first common axis are denoted by reference numeral 132 in FIG. 6c. Another pin 130a extending from the tray first end 114a may share a second common axis with another pin 130b extending from the tray second end 114b. The pins 130a, 130b sharing the second common axis are denoted 134 in FIG. 6c. The pins 132 sharing the first common axis are preferably simultaneously retractable, and the pins 134 sharing the second common axis are preferably simultaneously retractable.

A first control 135a (such as the sliding lever shown in FIGS. 6a and 6c) may be operatively attached to the pins 132 sharing the first common axis for causing the simultaneous retraction of the pins 132. Sliding the control 135a in a predetermined direction, for example, may actuate a linkage 136a to cause the pins 132 to compress, effectively causing the pins 132 to retract into the tray 110. Sliding the control 135a in another predetermined direction, for example, may actuate the linkage 136a to cause the pins 132 to separate, effectively causing the pins 132 to extend outwardly from the tray 110. The pins 132 are shown extended in FIG. 6c.

A second control 135b similar to the first control 135a may be operatively attached to the pins 134 sharing the second common axis for causing the simultaneous retraction of the pins 134. Sliding the control 135b in a predetermined direction, for example, may actuate a linkage 136b (similar to the linkage 136a) to cause the pins 134 to compress, effectively causing the pins 134 to retract into the tray 110. Sliding the control 135b in another predetermined direction, for example, may actuate the linkage 136b to cause the pins 132 to separate, effectively causing the pins 134 to extend outwardly from the tray 110. The pins 134 are shown retracted in FIG. 6c. Springs 137 bias the pins 132, 134 toward the extended configurations.

As shown in FIGS. 7a-7d, the pins 130a, 130b and the complementary tracks 122a, 122b may be configured such that: the tray 110 may be rotated upwardly about the pins 134 sharing the second common axis when the pins 132 sharing the first common axis are simultaneously retracted; the pins 134 sharing the second common axis may be slid along the tracks 122a, 122b between rearward and forward locations 124, 126 when the pins 132 sharing the first common axis are simultaneously retracted; the pins 132 sharing the first common axis may be coupled to the tracks 122a, 122b adjacent the rearward location 124 when the pins 134 are adjacent the forward location 126; and the pins 132 sharing the first common axis may be coupled to the tracks 122a, 122b adjacent the forward location 126 when the pins 134 are adjacent the rearward location 124. The pins 130a, 130b and the complementary tracks 122a, 122b may be configured such that: the tray 110 may be rotated upwardly about the pins 132 sharing the first common axis when the pins 134 sharing the second common axis are simultaneously retracted; the pins 132 sharing the first common axis may be slid along the tracks 122a, 122b between the rearward and forward locations 124, 126 when the pins 134 sharing the second common axis are simultaneously retracted; the pins 134 sharing the second common axis may be coupled to the tracks 122a, 122b adjacent the rearward location 124 when the pins 132 are adjacent the forward location 126; and the pins 134 sharing the second common axis may be coupled to the tracks 122a, 122b adjacent the forward location 126 when the pins 132 are adjacent the rearward location 124. The tray 110 may be completely separated from the first and second coupling elements 120a, 120b when all of the pins 132, 134 are retracted and separated from the tracks 122a, 122b.

As shown in FIGS. 3a-4 and 7a-7d, a base 140 may include the first and second coupling elements 120a, 120b. The base 140 may have a lower portion 142 configured for placement below the child safety seat 10 and side portions 144 extending upwardly from the lower portion 142. The respective side portions 144 preferably include the first and second coupling elements 120a, 120b, and the side portions 144 may be height-adjustable. While a clamp 146 is shown for maintaining a respective side portion 144 at selected heights, other adjustment mechanisms may be used.

Figure 8A:
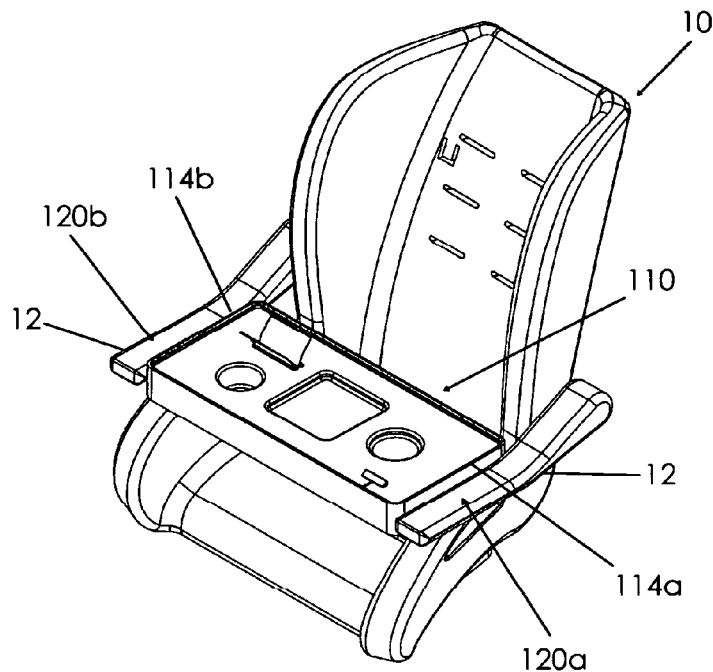
FIG. 8a is a perspective view of a reversible food and game tray device according to another embodiment of the present invention.

FIG. 8a shows that the child safety seat 10 may include first and second arms 12, and the arms 12 may respectively include the first and second coupling elements 120a, 120b.

Figure 8B:
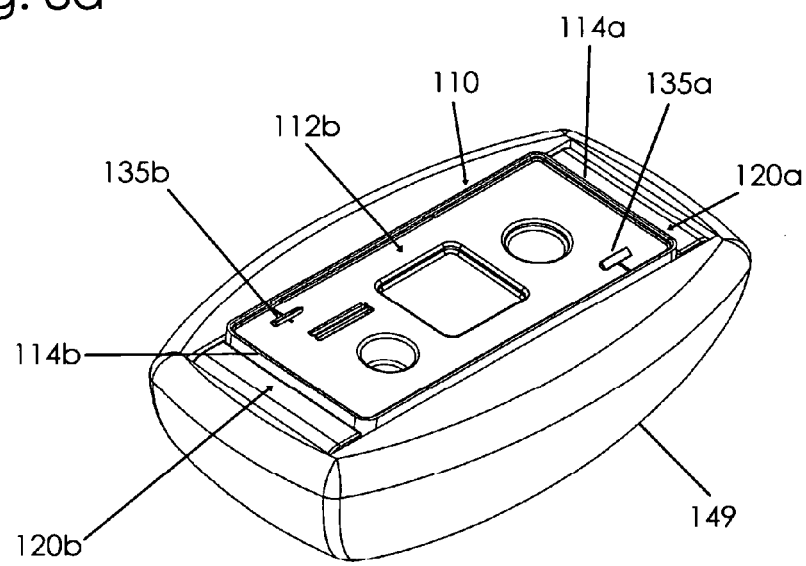
FIG. 8b is a perspective view of a reversible tray device according to still another embodiment of the present invention.

FIG. 8b shows that an alternate base 140 may include the first and second coupling elements 120a, 120b. The alternate base 140 may have a beanbag portion 149 or a similar portion made of foam or another form-fitting material for placement upon a child's lap.

In use, the tray 110 may be initially attached to the first and second coupling elements 120a, 120b so that the second side 112b is facing upwardly (FIG. 7a) to take advantage of the recessed areas 113b. Without completely removing the tray 110 from the first and second coupling elements 120a, 120b, the tray may then be inverted to display the first side 112a (FIG. 7d). To do so, the pins 132 sharing the first common axis may be simultaneously retracted as described above by using the first control 135a, and the tray 110 may be rotated upwardly about the pins 134 sharing the second common axis (FIG. 7b). The pins 134 sharing the second common axis may then be slid along the tracks 122a, 122b between rearward and forward locations 124, 126 (FIG. 7c). Finally, the pins 132 sharing the first common axis may be coupled to the tracks 122a, 122b adjacent the rearward location 124 when the pins 134 are adjacent the forward location 126 (FIG. 7d).

To then invert the tray 110 from displaying the first side 112a (FIG. 7d) to displaying the second side 112b (FIG. 7a), the pins 134 sharing the second common axis may be simultaneously retracted as described above by using the second control 135b, and the tray 110 may be rotated upwardly about the pins 132 sharing the first common axis. The pins 132 sharing the first common axis may then be slid along the tracks 122a, 122b between rearward and forward locations 124, 126. Finally, the pins 134 sharing the second common axis may be coupled to the tracks 122a, 122b adjacent the rearward location 124 when the pins 132 are adjacent the forward location 126 (FIG. 7a).

Figure 2A:
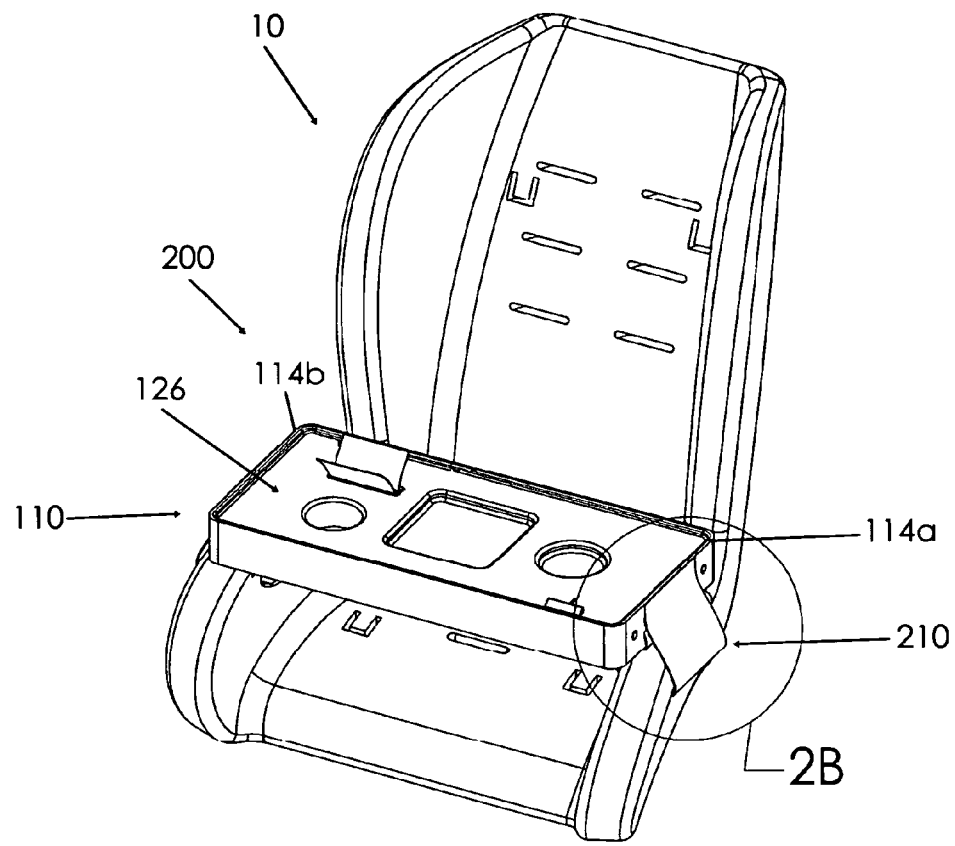
FIG. 2a is a perspective view of a reversible food and game tray device according to another embodiment of the present invention in use with a child safety seat.
Figure 2B:
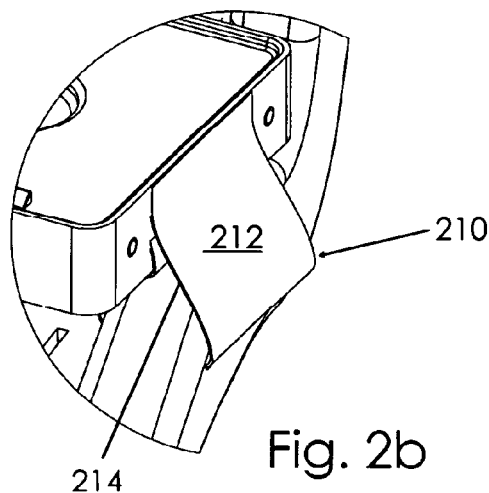
Figure 4:
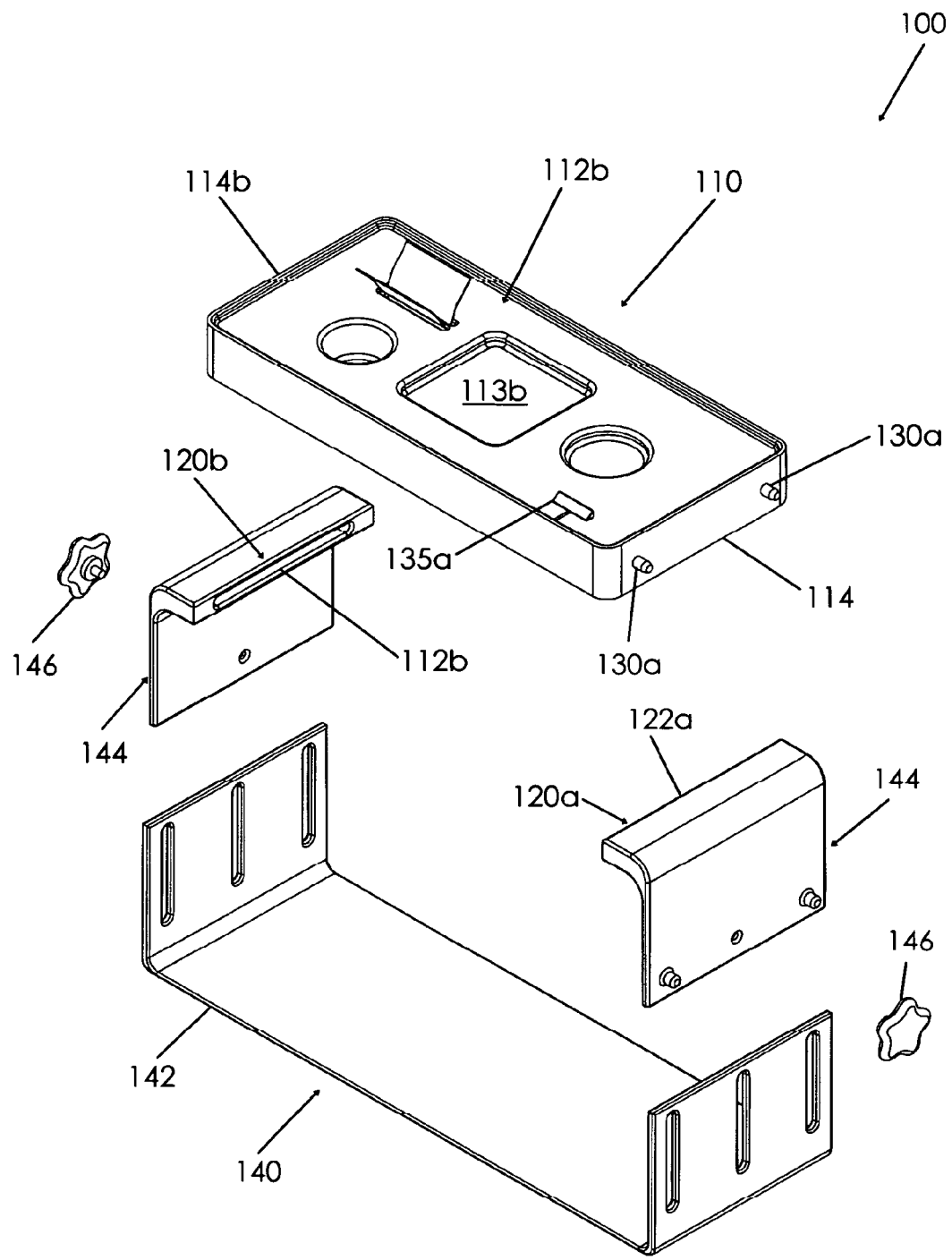
Figure 5:
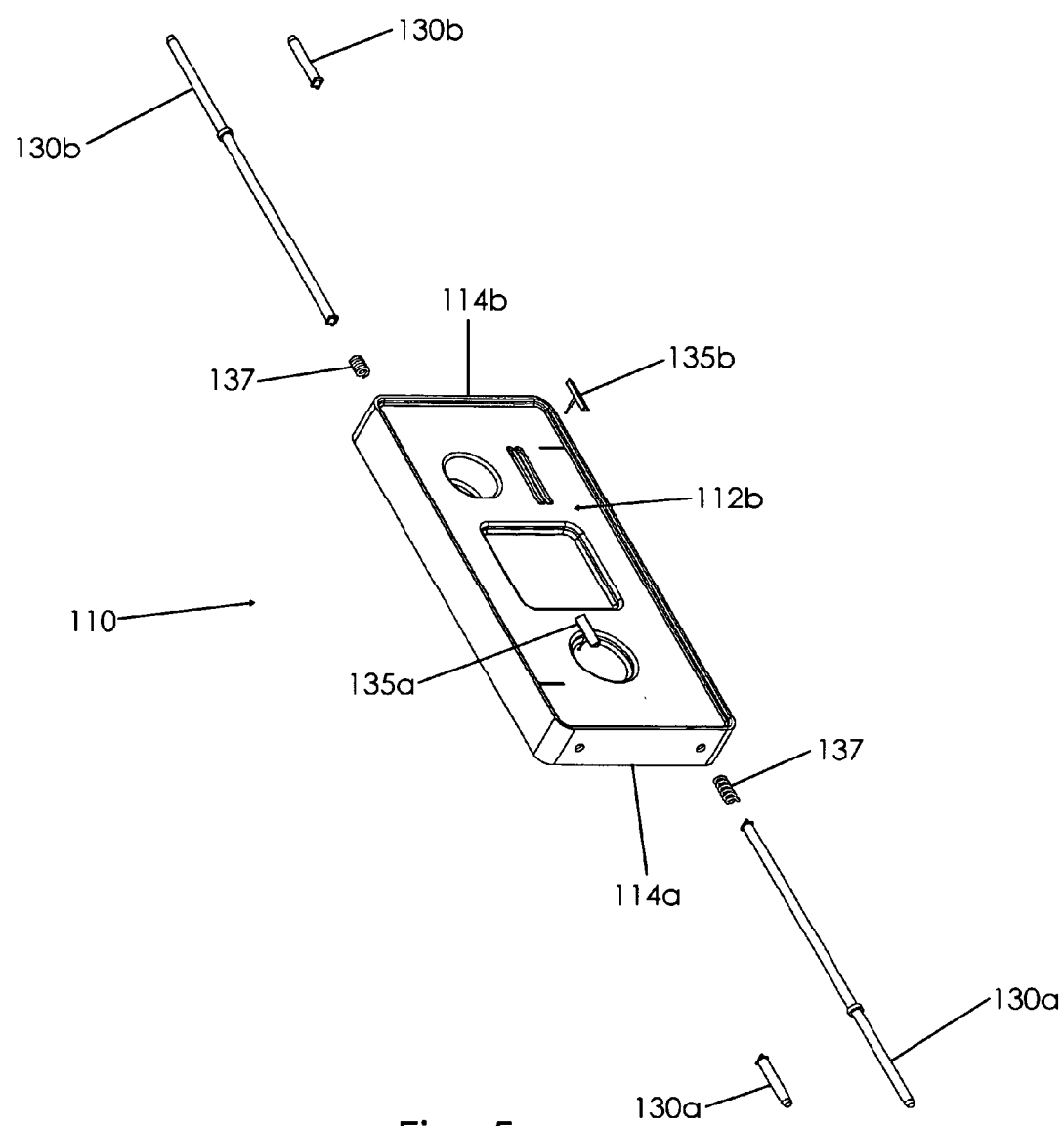
FIG. 5 is an exploded view of the tray as in FIG. 1a with the pins being exploded.

A tray device 200 according to another embodiment of the present invention is shown in FIGS. 2a and 2b and includes a construction substantially similar to the construction previously described except as- specifically noted below. More particularly, the first and second coupling elements 120a, 120b of the tray device 200 respectively include a strap 210 having at least one end separable from the tray 110. A first face 212 of each strap 210 has a hook fastener and/or a loop fastener. The tray 110 first and second ends 114a, 114b or a second face 214 of each strap 210 may have a complementary hook and/or loop fastener so that the first face 212 may be removably attached to the tray 210 or the second face 214. While acceptable hook and loop fasteners are sold under the registered trademark "Velcro", other hook and loop fasteners could also be used.

In use, the first or second side 112a, 112b of the tray may be facing upward, and the straps 210 may secure the tray 110 to the arms 12 of the child safety seat 10 (or another similar structure) by the attachment of the hook and loop fasteners. The straps 210 may then be unattached to the seat arms 12, and the other tray side 112a, 112b may be positioned upward and secured as described above.

It is understood that while certain forms of this invention have been illustrated and described, it is not limited thereto except insofar as such limitations are included in the following claims and allowable functional equivalents thereof.

What is claimed is as follows:

1. A reversible food and game tray device for use with a child safety seat, said device comprising:
   a tray having opposed first and second sides and opposed first and second ends;
   first and second coupling elements separable from said tray, said tray being attachable to said coupling elements whereby said first and second sides may be respectively positioned at an upward configuration;
   a base having a lower portion configured for placement below the child safety seat, said base having side portions extending upwardly from opposing ends of said base lower portion; wherein:
      said base side portions each have an adjustable height; and
      said base side portions respectively include said first and second coupling elements;
   wherein:
      said first and second ends of said tray respectively include one or more pins selectively extending outwardly therefrom;
      said first coupling element respectively includes a track having a configuration that is complementary to said one or more pins of said first end;
      said second coupling element respectively includes a track having a configuration that is complementary to said one or more pins of said second end; and
      placement of said one or more pins of said first end in said first coupling element track and placement of said one or more pins of said second end in said second coupling element track secures said tray to said first and second coupling elements;
      one said pins extending from said tray first end shares a first common axis with one said pin extending from said tray second end;
      another said pins extending from said tray first end shares a second common axis with another said pin extending from said tray second end;
      said pins sharing said first common axis are simultaneously retractable; and
      said pins sharing said second common axis are simultaneously retractable;
      said pins and said complementary tracks are configured such that:
         said tray may be rotated upwardly about said pins sharing said second common axis when said pins sharing said first common axis are simultaneously retracted;
         said pins sharing said second common axis may be slid along said tracks between rearward and forward locations when said pins sharing said first common axis are simultaneously retracted; and
         said pins sharing said first common axis may be coupled to said tracks adjacent one of said rearward and forward locations when said pins sharing said second common axis are adjacent another of said rearward and forward locations.

2. The device as in claim 1, further comprising a base and wherein said first and second coupling elements are situated on said base, said base having a lower portion configured for placement below the child safety seat and side portions extending upwardly from opposing ends of said lower portion, said side portions including said first and second coupling elements.

3. The device as in claim 2, wherein said base side portions each have an adjustable height.

4. The device as in claim 1, wherein said pins and said complementary tracks are configured such that:
   said tray may be rotated upwardly about said pins sharing said first common axis when said pins sharing said second common axis are simultaneously retracted;
   said pins sharing said first common axis may be slid along said tracks between rearward and forward locations when said pins sharing said second common axis are simultaneously retracted; and
   said pins sharing said second common axis may be coupled to said tracks adjacent one of said rearward and forward locations when said pins sharing said first common axis are adjacent another of said rearward and forward locations.

5. The device as in claim 1, wherein:
   said first side of said tray includes a predominantly flat region; and
   said second side of said tray defines a plurality of recessed areas for holding separate objects.

6. A reversible food and game tray device for use with a child safety seat, said device comprising:
   a tray having opposed first and second sides and opposed first and second ends, said first and second ends of said tray respectively including one or more pins selectively extending outwardly therefrom;
   a base having a lower portion configured for placement below the child safety seat and side portions extending upwardly from said lower portion; and
   wherein:
      said side portions respectively include first and second coupling elements;

said first coupling element having a track complementary to said one or more pins of said first end for selectively supporting said one or more pins of said first end; and said second coupling element having a track complementary to said one or more pins of said second end for selectively supporting said one or more pins of said second end wherein:

one said pin extending from said tray first end shares a first common axis with one said pin extending from said tray second end;

another said pin extending from said tray first end shares a second common axis with another said pin extending from said tray second end;

said pins sharing said first common axis are simultaneously retractable;

said pins sharing said second common axis are simultaneously retractable;

said pins and said complementary tracks are configured such that:

said tray may be rotated upwardly about said pins sharing said second common axis when said pins sharing said first common axis are simultaneously retracted;

said pins sharing said second common axis may be slid along said tracks between rearward and forward locations when said pins sharing said first common axis are simultaneously retracted; and said pins sharing said first common axis may be coupled to said tracks adjacent one of said rearward and forward locations when said pins sharing said second common axis are adjacent another of said rearward and forward locations.

7. The device as in claim 6, wherein:

said tray first side includes a predominantly flat region; and said tray second side defines a plurality of recessed areas for holding objects.

8. The device as in claim 6, wherein:

a first control is operatively attached to said pins sharing said first common axis for causing the simultaneous retraction of said pins sharing said first common axis; and a second control is operatively attached to said pins sharing said second common axis for causing the simultaneous retraction of said pins sharing said second common axis.

* * * * *